(12) United States Patent
Kim

(10) Patent No.: US 9,507,794 B2
(45) Date of Patent: Nov. 29, 2016

(54) METHOD AND APPARATUS FOR DISTRIBUTED PROCESSING OF FILE

(71) Applicant: ELECTRONICS AND TELECOMMUNICATIONS RESEARCH INSTITUTE, Daejeon (KR)

(72) Inventor: Kang-Ho Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 235 days.

(21) Appl. No.: 14/282,340

(22) Filed: May 20, 2014

(65) Prior Publication Data

US 2014/0351298 A1    Nov. 27, 2014

(30) Foreign Application Priority Data

May 23, 2013    (KR) .......................... 10-2013-0058231

(51) Int. Cl.
*G06F 17/30*    (2006.01)

(52) U.S. Cl.
CPC ... *G06F 17/30165* (2013.01); *G06F 17/30115* (2013.01); *G06F 17/30194* (2013.01)

(58) Field of Classification Search
CPC .................. G06F 17/30067; G06F 17/30165; G06F 17/30115; G06F 17/30194
USPC ................ 707/609, 694, 705, 758, 821–831; 711/154, 173, 209
See application file for complete search history.

(56) References Cited

U.S. PATENT DOCUMENTS

| | | | |
|---|---|---|---|
| 7,197,598 B2 * | 3/2007 | Kim et al. ..................... 711/114 |
| 2004/0105332 A1 * | 6/2004 | Crow et al. ................... 365/202 |

FOREIGN PATENT DOCUMENTS

| KR | 10-2002-0092550 | 12/2002 |
|---|---|---|
| KR | 10-2007-0016331 | 2/2007 |

OTHER PUBLICATIONS

Damien Le Moal et al., Stable Disk Performance With Non-Sequential Data Block Placement, 2010, IEEE, 6 Pages.*
David Quigley et al., "Unionfs: User- and Community-Oriented Development of a Unification File System", 2006 Linux Symposium, vol. 2, pp. 349-362.

* cited by examiner

*Primary Examiner* — Jean B Fleurantin
(74) *Attorney, Agent, or Firm* — Kile Park Reed & Houtteman PLLC

(57) ABSTRACT

A method and apparatus for the distributed processing of a file are disclosed. The apparatus includes a shared data block selection unit, a modified data block selection unit, a first file distributed-processing unit, and a second file distributed-processing unit. The shared data block selection unit selects at least one first data block to remain without change after distributed processing of a file. The modified data block selection unit selects at least one second data block to be modified after the distributed processing of a file. The first file distributed-processing unit allows an inode after the distributed processing of a file to point to the first data blocks so that the first data block is shared before and after the distributed processing of a file. The second file distributed-processing unit allows the inode after the distributed processing of a file to point to at least one third data block.

8 Claims, 6 Drawing Sheets

METHOD AND APPARATUS FOR DISTRIBUTED PROCESSING OF FILE

CROSS REFERENCE TO RELATED APPLICATION

This application claims the benefit of Korean Patent Application No. 10-2013-0058231, filed on May 23, 2013, which is hereby incorporated by reference in its entirety into this application.

BACKGROUND OF THE INVENTION

1. Technical Field

The present invention relates generally to a method and apparatus for the distributed processing of a file and, more particularly, to a method and apparatus for the distributed processing of a file that are capable of efficiently performing segmentation, merging, and front addition in connection with a large file.

2. Description of the Related Art

A conventional file system provides only file open, read, write, end-add, end-truncate, and close operations. In computer systems used in genome and protein analyses, efficient tasks cannot be performed using only the operations that are provided by the conventional file system as described above.

The size of an input data file for a genome analysis application is very large (e.g., 218 GB), and the time it takes to analyze the content of the data file is very long. In order to reduce analysis time, a data file is segmented into a plurality of small files, the small files are processed in parallel, the processed files are merged into a single large file, and the single large file is used as input in a subsequent stage.

As described above, the conventional file system offsets a data parallelism effect because it consumes a lot of time to perform the tasks of segmenting a large file and merging small files.

Furthermore, in the conventional file system, in order to fragment a file, the large input/output bandwidths of a data storage device are used because the original file needs to be read and written into multiple files, thereby deteriorating system efficiency and performance.

In connection with this, Korean Patent Application Publication No. 10-2002-0092550 discloses a mass file storage system and a method of deleting and adding the data blocks of dynamic multi-level inodes using the system.

SUMMARY OF THE INVENTION

Accordingly, the present invention has been made keeping in mind the above problems occurring in the conventional art, and an object of the present invention is to provide a method and apparatus for the distributed processing of a file that are capable of performing segmentation, merging, and front addition in connection with a large file only by using inode information and manipulating a small number of data blocks.

In accordance with an aspect of the present invention, there is provided a method for the distributed processing of a file, including selecting at least one first data block to remain without change after distributed processing of a file; selecting at least one second data block to be modified after the distributed processing of a file; pointing, by an inode after the distributed processing of a file, to the first data block so that the first data block is shared before and after the distributed processing of a file; and pointing, by the inode after the distributed processing of a file, to at least one third data block modified from the second data block.

The distributed processing of a file may correspond to any one of file segmentation, file merging, and addition into a front of a file.

If the distributed processing of a file corresponds to the file segmentation, the third data block may correspond to two data blocks copied from two block fragments of the second data block that has been internally fragmented after the file segmentation.

If the distributed processing of a file corresponds to the file merging and the sum of sizes of data fragments of the internally fragmented second data block is equal to or smaller than a size of one data block, the at least third data block is one in number.

If the distributed processing of a file corresponds to the addition into the front of a file, the second data block is a first data block of a file before the distributed processing of a file and there is an empty space corresponding to a size of new data to be added to the first data block, the third data block may correspond to a data block that is obtained by moving existing data of the first data block backward and copying the new data in front of the existing data.

If the distributed processing of a file corresponds to the addition into the front of a file, the second data block is a first data block of a file before the distributed processing of a file and there is no empty space corresponding to a size of new data to be added to the first data block, the third data block may become an index block, and an inode of the index block may sequentially point to a data block including the new data and the first data block.

In accordance with an aspect of the present invention, there is provided an apparatus for the distributed processing of a file, including a shared data block selection unit configured to select at least one first data block to remain without change after distributed processing of a file; a modified data block selection unit configured to select at least one second data block to be modified after the distributed processing of a file; a first file distributed-processing unit configured to allow an inode after the distributed processing of a file to point to the first data blocks so that the first data block is shared before and after the distributed processing of a file; and a second file distributed-processing unit configured to allow the inode after the distributed processing of a file to point to at least one third data block modified from the second data block.

The distributed processing of a file may correspond to any one of file segmentation, file merging, and addition into the front of a file.

If the distributed processing of a file corresponds to the file segmentation, the third data block may correspond to two data blocks copied from two block fragments of the second data block that has been internally fragmented after the file segmentation.

If the distributed processing of a file is the file merging and a sum of sizes of data fragments of the internally fragmented second data block is equal to or smaller than a size of one data block, the at least third data block is one in number.

If the distributed processing of a file corresponds to the addition into the front of a file, the second data block is a first data block of a file before the distributed processing of a file and there is an empty space corresponding to a size of new data to be added to the first data block, the third data block may correspond to a data block that is obtained by moving existing data of the first data block backward and copying the new data in front of the existing data.

If the distributed processing of a file corresponds to the addition into the front of a file, the second data block is a first data block of a file before the distributed processing of a file and there is no empty space corresponding to a size of new data to be added to the first data block, the third data block may become an index block, and an inode of the index block may sequentially point to a data block including the new data and the first data block.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
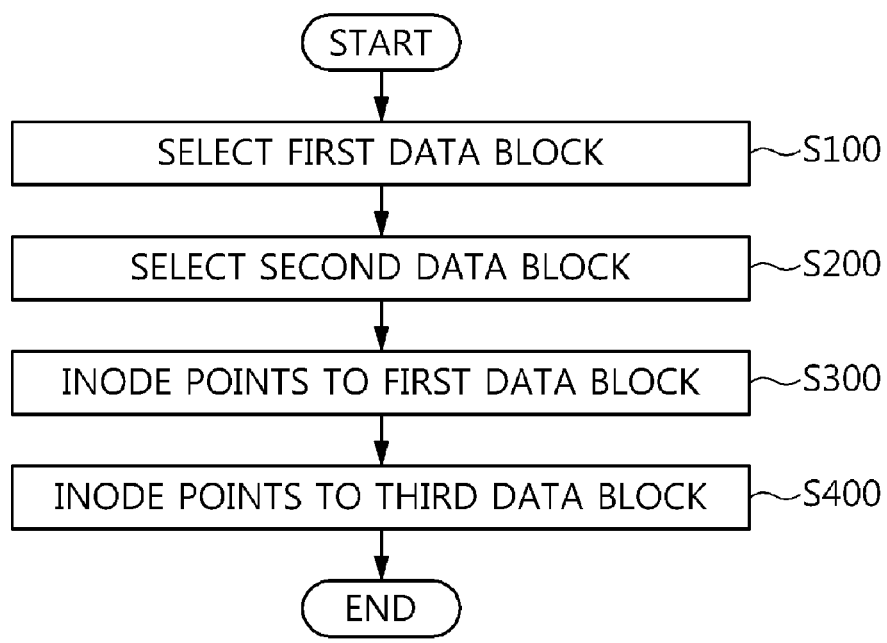
FIG. 1 is a flowchart illustrating a method for the distributed processing of a file according to an embodiment of the present invention.

Embodiments of the present invention will be described with reference to the accompanying drawings in order to describe the present invention in detail so that those having ordinary knowledge in the technical field to which the present pertains can easily practice the present invention. It should be noted that same reference numerals are used to designate the same or similar elements throughout the drawings. In the following description of the present invention, detailed descriptions of known functions and constructions which are deemed to make the gist of the present invention obscure will be omitted.

A method and apparatus for the distributed processing of a file according to embodiments of the present invention will be described in detail below with reference to the accompanying drawings.

FIG. 1 is a flowchart illustrating a method for the distributed processing of a file according to an embodiment of the present invention.

Referring to FIG. 1, in the method for the distributed processing of a file according to this embodiment of the present invention, first, at least one first data block that will remain without change after the distributed processing of a file is selected at step S100. The distributed processing of a file may correspond to any one of file segmentation, file merging, and addition into the front of a file.

Thereafter, at least one second data block to be modified after the distributed processing of a file is selected at step S200.

Thereafter, in order for the first data block to be shared before and after the distributed processing of a file, an inode after the distributed processing of a file points to the first data block at step S300.

Finally, the inode after the distributed processing of a file points to at least one third data block modified from the second data block at step S400.

If the distributed processing of a file corresponds to file segmentation, the third data block corresponds to two blocks that are copied from two block fragments into which the second data block that has been internally fragmented after the file segmentation. The configuration of data blocks attributable to file segmentation will be described in detail below with reference to FIG. 3.

Furthermore, if the distributed processing of a file corresponds to file merging and the sum of the data fragments of the internally fragmented second data block is equal to or smaller than the size of a single data block, the at least one third data block may be one in number. The configuration of data blocks attributable to file merging will be described in detail below with reference to FIGS. 5 and 6.

Furthermore, if the distributed processing of a file corresponds to addition into the front of a file, the second data block is the first data block of a file before the distributed processing of a file, and the configuration of the third data block may vary depending on whether or not there is an empty space corresponding to the size of new data to be added to the first data block.

For example, the second data block is the first data block of a file before the distributed processing of a file, and the third data block corresponds to a data block that is obtained by moving the existing data of the first data block backward and then copying the new data in front of the existing data if there is an empty space corresponding to the size of new data to be added to the first data block. The configuration of data blocks attributable to addition into the front of a file when there is an empty space will be described in detail below with reference to FIG. 7.

The second data block is the first data block of a file before the distributed processing of a file, the third data blocks is an index block if there is no empty space corresponding to the size of new data to be added to the first data block, and the inode of the index block sequentially points a data block including the new data and the first data block. The configuration of data blocks attributable to addition into the front of a file if there is no empty space will be described in detail below with reference to FIG. 8.

Figure 2:
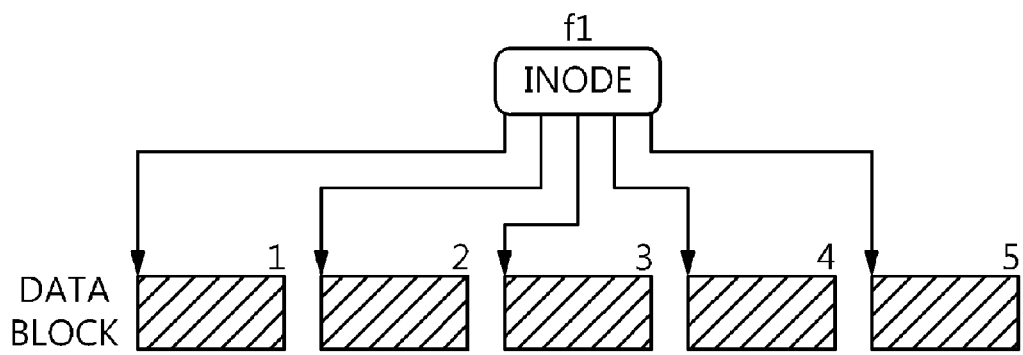
FIG. 2 is a diagram illustrating the configuration of the data blocks of an original file according to an embodiment of the present invention.

FIG. 2 is a diagram illustrating the configuration of the data blocks of an original file according to an embodiment of the present invention.

Figure 3:
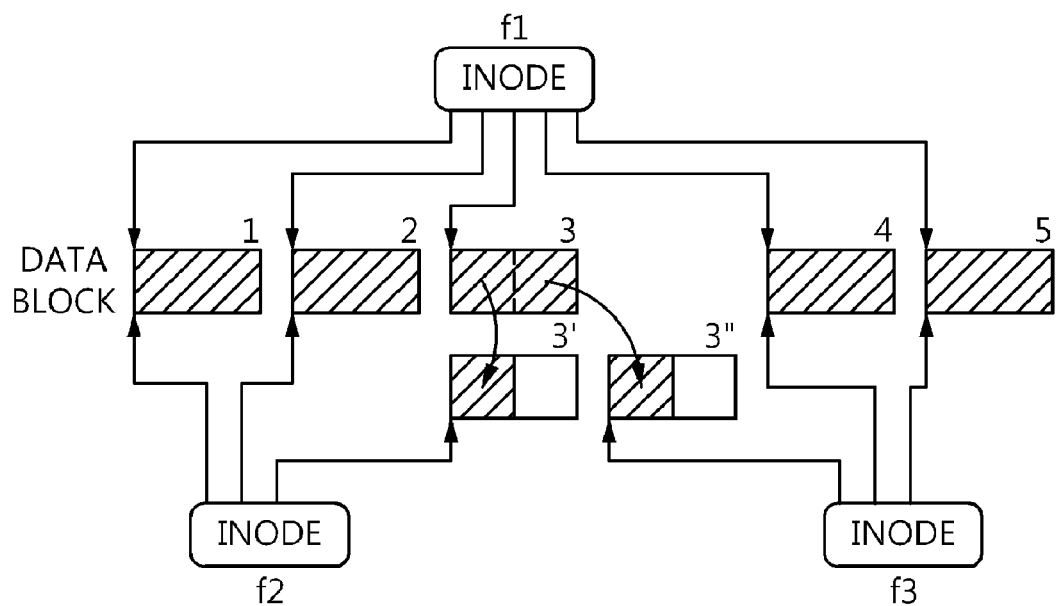
FIG. 3 is a diagram illustrating the configuration of data blocks when an original file having the configuration of FIG. 2 is segmented into two files.

Referring to FIG. 2, a file 1 'f1' is an original file, and includes a plurality of data blocks, that is, data blocks 1, 2, 3, 4 and 5, and an inode indicative of the file 1 'f1'. The inode points to the plurality of data blocks 1, 2, 3, 4 and 5. In FIG. 3, which will be described later, an example in which the file 1 'f1' is segmented into two files will be described.

An inode is a data structure that is used in existing Unix-series file systems. The inode includes information about a file system, such as a normal file or a directory. Each file has a single inode, and the inode includes information about a corresponding file, such as an owner group, access inode (e.g., a read, write, or execution right), file type, and an inode number (or an i-number). The files of a file system may be identified by unique inode numbers. In general, when a file system is generated, about one percent of the overall space is assigned to inodes. Since the space for inodes is limited, the maximum number of files of a file system is also limited. In most cases, however, a user feels that an almost infinite number of files may be generated and managed.

FIG. 3 is a diagram illustrating the configuration of data blocks when an original file having the configuration of FIG. 2 is segmented into two files.

Referring to FIG. 3, the original file having the configuration of FIG. 2 is segmented into two files: a file 2 'f2' and a file 3 'f3' having the same size. The file 2 'f2' and the file 3 'f3' generate respective inodes indicative of the two files, and the generated inodes are set such that they point to the data blocks of the file 1 'f1'. In this case, since the file 1 'f1' is segmented into two files in the middle of the data block 3 of the file 1 'f1', two new blocks, that is, a data block 3' and a data block 3", are generated, the front half of the data block 3 is copied to the data block 3', and the rear half thereof is copied to the data block 3". That is, the data block 3 of the file 1 'f1' corresponds to the second data block, the data block 3' and the data block 3" generated from the data block 3 correspond to the third data block, and the remaining data blocks 1, 2, 4, and 5 correspond to the first data block. Thereafter, the inode of the file 2 'f2' points to the data blocks 1, 2 and 3' of the file 1 'f1', and the inode of the file 3 'f1' points to the data block 3", 4 and 5 of the file 1 'f1', thereby completing file segmentation. Accordingly, the file 2 'f2' and the file 3 'f3' share the data blocks 1, 2, 4 and 5 of the file 1 'f1'. If any one of the shared blocks is modified, all the blocks are copied and then the content of each file is stored.

Figure 4:
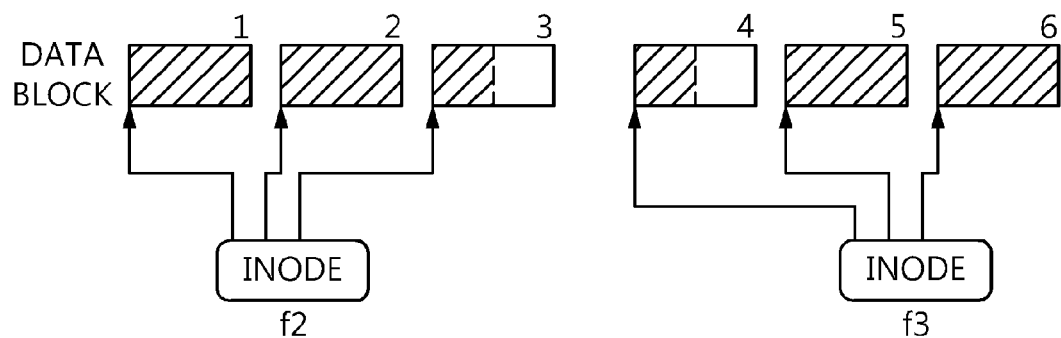
FIG. 4 is a diagram illustrating the configuration of the data blocks of two original files to be merged according to an embodiment of the present invention.

FIG. 4 is a diagram illustrating the configuration of the data blocks of two original files to be merged according to an embodiment of the present invention.

Referring to FIG. 4, a file system according to an embodiment the present invention merges files by permitting internal fragmentation to a first block. Accordingly, a file 2 'f2' includes a plurality of data blocks, that is, data blocks 1, 2 and 3, and an inode indicative of the file 2 'f2'. Furthermore, a file 3 'f3' includes a plurality of data blocks, that is, data blocks 4, 5 and 6, and an inode indicative of the file 3 'f3'. A file 4 'f4' that points to all the data blocks of the files 2 'f2' and 3 'f3' configured as described above is generated, and the file 2 'f2' and the file 3 'f3' are merged using the file 4 'f4' in two forms, as illustrated in FIGS. 5 and 6.

Figure 5:
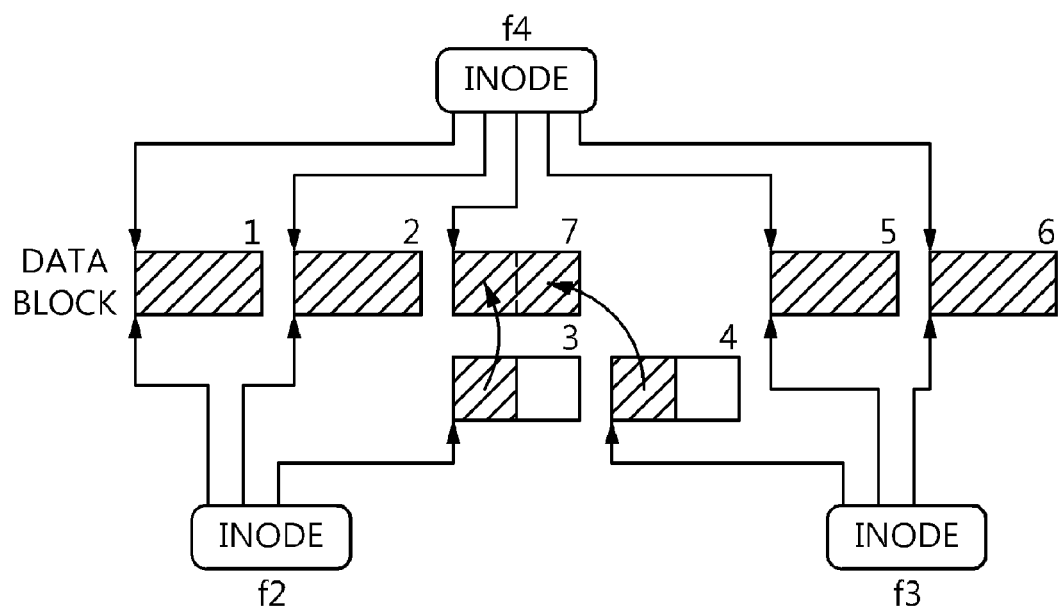
FIGS. 5 and 6 are diagrams illustrating the configurations of data blocks when original files having the construction of FIG. 4 are merged.
Figure 6:
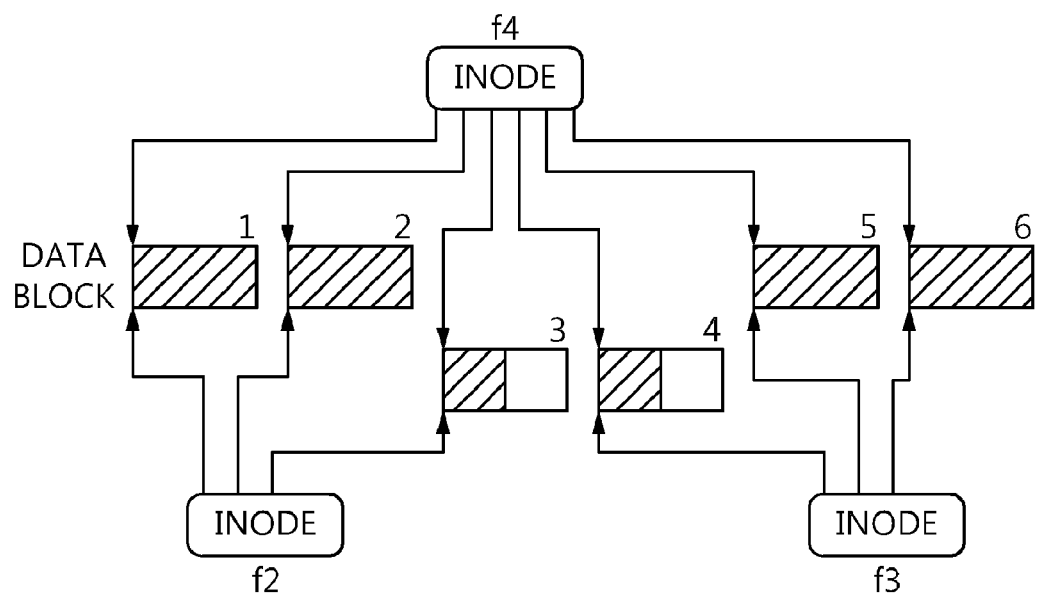

FIGS. 5 and 6 are diagrams illustrating the configurations of data blocks when original files having the construction of FIG. 4 are merged.

Referring to FIG. 5, a file 2 'f2' includes data blocks 1, 2, and 3 and an inode indicative of the file 2 'f2', and the file 3 'f3' includes data blocks 4, 5, and 6 and an inode indicative of the file 3 'f3'. Furthermore, a file 4 'f4' including an inode that points to the data blocks of the file 2 'f2' and the file 3 'f3' is generated. In this case, if the sum of the data fragments of the data block 3 of the file 2 'f2' and the data block 4 of the file 3 'f3' is equal to or smaller than the size of one data block, a new data block, that is, one data block 7, is generated. In this case, if a memory location is assigned to a file, the data block 3 of the file 2 'f2' and the data block 4 of the file 3 'f3' are internally fragmented data blocks that have been assigned and consumed to maintain block units because all basic input and output operations are performed on a block basis. Furthermore, the data block 7 corresponds to a third data block, the data blocks 1 and 2 of the file 2 'f2' and the data blocks 5 and 6 of the file 3 'f3' correspond to a first data block, and the data block 3 of the file 2 'f2' and the data block 4 the file 3 'f3' correspond to a second data block. Thereafter, the inode of the file 4 is allowed to point to the data blocks 1, 2, 5, 6 and 7 of the file 2 'f2' and the file 3 'f3', thereby completing file merging.

Referring to FIG. 6, a file 2 'f2' includes data blocks 1, 2, and 3 and an inode indicative of the file 2 'f2', and a file 3 'f3' includes data blocks 4, 5, and 6 and an inode indicative of the file 3 'f3'. Furthermore, a file 4 'f4' including an inode that points to the data blocks of the file 2 'f2' and the file 3 'f3' is generated. In this case, if the sum of the data fragments of the data block 3 of the file 2 'f2' and the data block 4 of the file 3 'f3' is larger than the size of one data block, the file 4 'f4' points to the data block 3 of the file 2 'f2', the data block 4 of the file 3 'f3' and other data blocks, thereby completing file merging. In this case, a third data block is not generated, the data blocks 1 and 2 of the file 2 'f2' and the data blocks 5 and 6 of the file 3 'f3' correspond to a first data block, and the data block 3 of the file 2 'f2' and the data block 4 of the file 3 'f3' correspond to a second data block.

Figure 7:
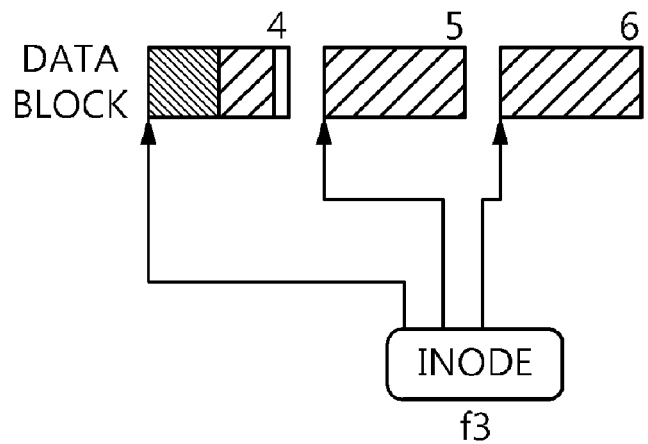
FIGS. 7 and 8 are diagrams illustrating the configuration of data blocks when data is added to the front of an original file having the construction of FIG. 4.
Figure 8:
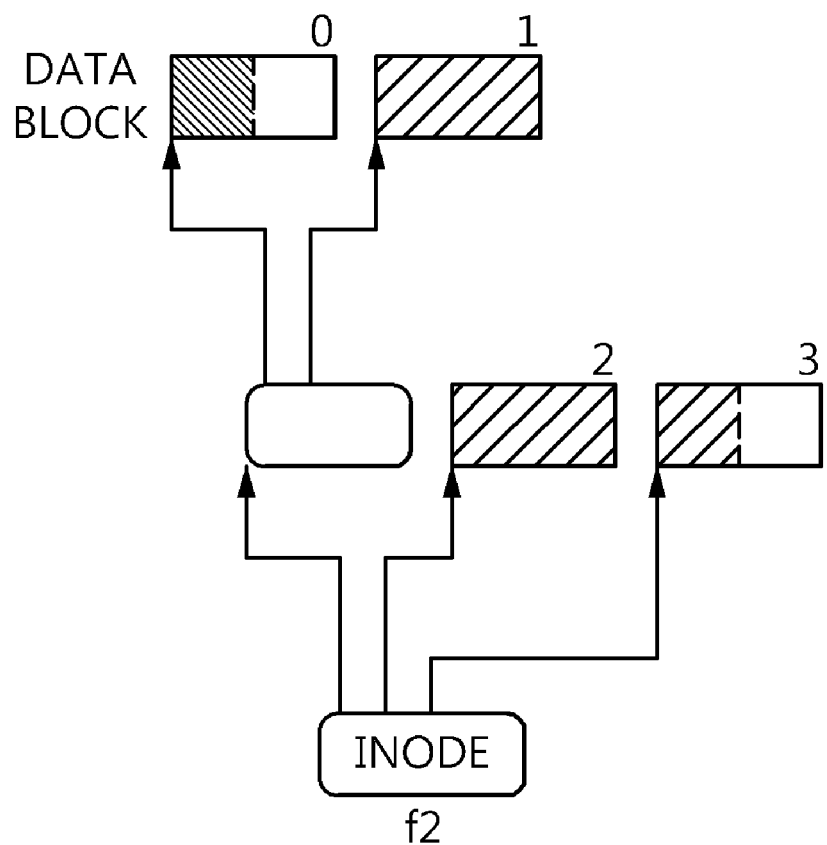

FIGS. 7 and 8 are diagrams illustrating the configuration of data blocks when data is added to the front of an original file having the construction of FIG. 4.

Referring to FIG. 7, front addition may be implemented using an empty space because the data block 4 of the file 3 'f3' of FIG. 4 includes the empty space. That is, if there is an empty space corresponding to the size of new data to be added to the data block 4, the existing data of the data block 4 is moved backward and the new data is then copied, thereby completing addition into the front of a file. In this case, the data blocks 5 and 6 of the file 3 'f3' corresponds to a first data block, and the data block 4 corresponds to a second data block. In this case, the front-added data block portion of the data block 4 corresponds to a third data block.

Referring to FIG. 8, front addition may be implemented by changing the data block 1 into an index block, that is, a data block 0, because there is an empty space in the data block 1 of the file 2 'f2' of FIG. 4. That is, if there is no empty space corresponding to the size of new data to be added to the data block 1, the data block 1 is changed into an index block and the inode of the index block is allowed to sequentially point to a data block including the new data and the data block 1, thereby completing addition into the front of a file. In this case, the data blocks 2 and 3 of the file 2 'f2' correspond to a first data block, the data block 1 correspond to a second data block, and the data block 0 correspond to a third data block.

Figure 9:
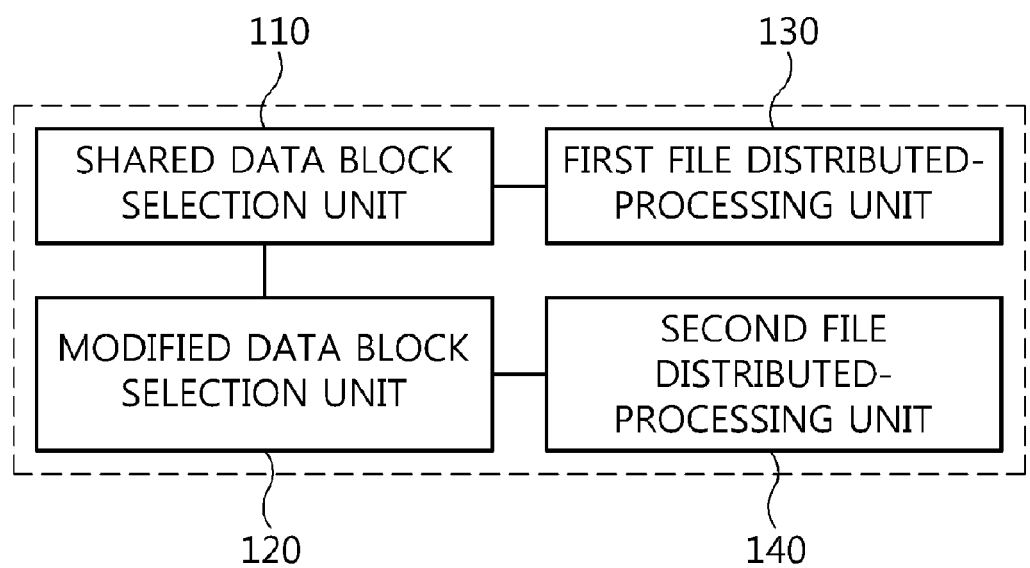
FIG. 9 is a block diagram of an apparatus for the distributed processing of a file according to an embodiment of the present invention.

FIG. 9 is a block diagram of an apparatus 100 for the distributed processing of a file according to an embodiment of the present invention.

Referring to FIG. 9, the apparatus 100 for the distributed processing of a file according to the present invention includes a shared data block selection unit 110, a modified data block selection unit 120, a first file distributed-processing unit 130, and a second file distributed-processing unit 140.

The shared data block selection unit 110 selects a first data block that will remain without change after the distributed processing of a file. The distributed processing of a file may correspond to any one of file segmentation, file merging, and addition into the front of a file.

The modified data block selection unit 120 selects at least one second data block to be modified after the distributed processing of a file.

The first file distributed-processing unit 130 allows an inode after the distributed processing of a file to point to the first data block so that the first data block is shared before and after the distributed processing of a file.

The second file distributed-processing unit 140 allows an inode after the distributed processing of a file to point to one or more third data blocks modified from the second data blocks.

If the distributed processing of a file corresponds to file segmentation, the third data block corresponds to two blocks copied from the two block fragments of the second data block that has been internally fragmented after the file segmentation.

Furthermore, if the distributed processing of a file corresponds to file merging and the sum of the data fragments of the internally fragmented second data block is equal to or smaller than the size of one data block, the number of third data blocks may be one.

Furthermore, if the distributed processing of a file corresponds to addition into the front of a file, the second data block corresponds to the first data block of a file before the distributed processing of a file, and the third data block may have a different configuration depending on whether or not there is an empty space corresponding to the size of new data to be added to the first data block. For example, if the second data block is the first data block of a file before the distributed processing of a file and there is an empty space corresponding to the size of new data to be added to the first data block, the third data block may correspond to a data block that has been obtained by moving the existing data of the first data block backward and then copying the new data in front of the existing data. If the second data block is the first data block of a file before the distributed processing of a file and there is no empty space corresponding to the size of new data to be added to the first data block, the third data block may become an index block and the inode of the index block may be allowed to sequentially point to a data block including the new data and the first data block.

As described above, in accordance with the method and apparatus for the distributed processing of a file according to the present invention, segmentation, merging, and front addition are performed on a large file by using inode information and manipulating a small number of data blocks, thereby reducing the time it takes to read and write data blocks and the number of times that data blocks are read and written and also improving the efficiency of a file system.

Furthermore, in accordance with the method and apparatus for the distributed processing of a file according to the present invention, parallelism is increased by segmenting a large file into a large number of files if there are many available resources, and parallelism is reduced by segmenting a large file into a small number of files if there are small available resources, thereby making the best use of parallelism of data blocks and thus improving performance of a file system.

Furthermore, in accordance with the method and apparatus for the distributed processing of a file according to the present invention, a file memory space can be efficiently used by allowing an original file and a segmented or merged file to share most of data blocks.

Accordingly, in accordance with the method and apparatus for the distributed processing of a file according to the present invention, in a genome analysis application, the time it takes to perform file segmentation, file merging and front addition, that is, additional tasks for data analysis, can be reduced, thereby preventing a main data analysis task from being interrupted, and the numbers of segmented files and merged files can be expected, thereby reducing the burden of a file storage space.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A computer-implemented method for distributed processing of a file stored in a memory space, comprising:
   selecting at least one first data block stored in the memory space to remain without change after distributed processing of a file;
   selecting at least one second data block stored in the memory space to be modified after the distributed processing of a file;
   pointing, by an inode after the distributed processing of a file, to the first data block so that the first data block is shared before and after the distributed processing of a file; and
   pointing, by the inode after the distributed processing of a file, to at least one third data block stored in the memory space and modified from the second data block,
   wherein the distributed processing of a file corresponds to any one of file segmentation, file merging, and addition into a front of a file, and
   wherein if the distributed processing of a file corresponds to the addition into the front of a file, the second data block is a first data block of a file before the distributed processing of a file and there is an empty space corresponding to a size of new data to be added to the second data block, the third data block corresponds to a data block that is obtained by moving existing data of the second data block backward and copying the new data in front of the existing data.

2. The method of claim 1, wherein if the distributed processing of a file corresponds to the file segmentation, the third data block corresponds to two data blocks copied from two block fragments of the second data block that has been internally fragmented after the file segmentation.

3. The method of claim 1, wherein if the distributed processing of a file corresponds to the file merging and a sum of sizes of data fragments of the internally fragmented second data block is equal to or smaller than a size of one first data block, the at least third data block is one in number.

4. The method of claim 1, wherein if the distributed processing of a file corresponds to the addition into the front of a file, the second data block is a first data block of a file before the distributed processing of a file and there is no empty space corresponding to a size of new data to be added to the second data block, the third data block becomes the index block, and an inode of the index block sequentially points to a data block including the new data and the first data block.

5. A computer system for distributed processing of a file stored in a memory space, having a processor, comprising:
   a shared data block selection unit configured to select at least one first data block stored in the memory space to remain without change after distributed processing of a file;
   a modified data block selection unit configured to select at least one second data block stored in the memory space to be modified after the distributed processing of a file;

a first file distributed-processing unit configured to allow an inode after the distributed processing of a file to point to the first data blocks so that the first data block is shared before and after the distributed processing of a file; and a second file distributed-processing unit configured to allow the inode after the distributed processing of a file to point to at least one third data block stored in the memory space and modified from the second data block, wherein the distributed processing of a file corresponds to any one of file segmentation, file merging, and addition into a front of a file, and wherein if the distributed processing of a file corresponds to the addition into the front of a file, the second data block is a first data block of a file before the distributed processing of a file and there is an empty space corresponding to a size of new data to be added to the second data block, the third data block corresponds to a data block that is obtained by moving existing data of the second data block backward and copying the new data in front of the existing data.

6. The apparatus of claim 5, wherein if the distributed processing of a file corresponds to the file segmentation, the third data block corresponds to two data blocks copied from two block fragments of the second data block that has been internally fragmented after the file segmentation.

7. The apparatus of 5, wherein if the distributed processing of a file is the file merging and a sum of sizes of data fragments of the internally fragmented second data block is equal to or smaller than a size of one first data block, the at least third data block is one in number.

8. The apparatus of claim 5, wherein if the distributed processing of a file corresponds to the addition into the front of a file, the second data block is a first data block of a file before the distributed processing of a file and there is no empty space corresponding to a size of new data to be added to the second data block, the third data block becomes the index block, and an mode of the index block sequentially points to a data block including the new data and the first data block.

* * * * *